United States Patent Office 3,399,159
Patented Aug. 27, 1968

3,399,159
CATIONIC LATICES AND METHOD OF PREPARING SAME
Carlos M. Samour, Wellesley Hills, Mass., assignor to The Kendall Company, Boston, Mass., a corporation of Massachusetts
No Drawing. Continuation-in-part of application Ser. No. 457,526, May 20, 1965. This application Feb. 6, 1967, Ser. No. 614,002
15 Claims. (Cl. 260—29.6)

ABSTRACT OF THE DISCLOSURE

A process for preparing polymeric dispersions, free of surfactants or conventional dispersing agents, and in which the polymer is cationically charged, which comprises polymerizing at a controlled rate in an acid medium a mixture of monomers comprising a nitrogen-containing monomer and an alkyl acrylic ester. A redox catalyst is used, and the monomers are introduced into the system at a rate which is within the range of proportions desired in the finished polymer, to avoid the formation of coagulum.

This application is a continuation-in-part of my co-pending application Ser. No. 547,526, filed May 20, 1965, now abandoned, which in turn in a continuation-in-part of my application Ser. No. 329,309, filed Dec. 9, 1963, now abandoned. It relates to new cationic polymeric compositions, and to processes for producing such systems. In one specific embodiment, the invention relates to a new polymeric dispersing system in which the dispersing agent is a cationic copolymer, and to the utilization of such a dispersing system for the preparation of cationically-stabilized two-component polymeric latices.

In a second specific embodiment of the invention, the reaction is carried out in such a way that a one-component, self-dispersed polymer is formed, in which the cationic dispersing group is an integral part of the polymeric molecule.

Polymeric latices are for the most part conventionally produced by an emulsion polymerization process, in which monomeric materials are polymerized while they are dispersed in an aqueous medium by means of a surface active agent. The surface active agent may be anionic in nature, such as soap flakes or sodium lauryl sulfate. Alternatively, it may be of a nonionic type as represented by various ethylene oxide derivatives, or by polyhydroxy compounds, or it may be cationic, as represented by alkyl ammonium halides. Cationic active agents are not entirely satisfactory when used as sole emulsifying agent, and are frequently combined with a nonionic agent for improved performance. The polymerization of monomeric materials is also frequently effected in the presence of water-soluble protective colloids or stabilizing agents. Any of the above emulsifying agents leads to the presence of a water-sensitive ingredient in the final polymeric latex. For latex utilizations wherein wet strength is desirable, as in paper coatings, non-woven fabrics, certain pressure-sensitive adhesive tapes, and the like, the presence of such water-sensitive material is deleterious.

Although it has heretofore been proposed in U.S. Patent 3,108,979 to prepare stable dispersions by co-polymerizing certain amino alcohol esters with a variety of other monomers in the absence of conventional emulsifiers, it has now been found that best results can be achieved in the present invention only by copolymerizing very restricted classes of monomeric materials, and further that only certain carefully controlled conditions may be used during the polymerization of these monomeric materials. The polymerization must be initiated with a water-soluble redox catalyst; peroxides and persulfates, which are commonly employed for polymerizations are ineffective for carrying out the present invention in the absence of a reducing agent. In addition, polymerization must be continued throughout the period during which the monomeric materials are being added to the reaction mixture, and the relative proportions of the monomeric materials to each other must be maintained within a defined range throughout this period; the entire amount of individual monomeric materials cannot be added to the polymerization mixture one after the other, nor can the entire amount of monomeric material be added to the polymerization mixture before polymerization has been initiated.

It is, therefore, an object of this invention to prepare cationically-stabilized polymeric dispersing systems of a new composition, wherein the dispersing polymer is essentially insoluble in water and may be precipitated from dispersion by charge neutralization.

In one aspect of the invention, termed a one-component system, only a single species of polymer is prepared, the polymer being self-dispersed in an aqueous medium by reason of the presence of cationic dispersing groups in the polymer molecule, and being useful as a binder or bonding agent for nonwoven fabrics, for example, and as a component of pressure-sensitive adhesive compositions. In another aspect of the invention, called a two-component system, the self-dispersed polymer is employed as the dispersing agent for polymerizing additional monomers, different from the first, so that the final aqueous dispersion contains two species of polymer, only one of which contains cationic dispersing groups in the polymer molecule. The two-component system is also useful as a binder or bonding agent for nonwoven fabrics and as a component of pressure-sensitive adhesive compositions. In both aspects of the invention, no water-soluble dispersing agent is employed.

An additional object of this invention is the utilization of such polymeric latices for the preparation of bonded nonwoven fabrics and of pressure-sensitive adhesive tapes. A more specific object of the invention is the preparation of a new polymeric dispersing system comprising a positively charged copolymer of one nitrogen-containing salt-forming organic monomer with at least one ethylenically-unsaturated organic monomer of a class set forth below. It is also an object of this invention to prepare a polymeric dispersing system wherein the mole-ratios of the monomers are so chosen as to facilitate the polymerization therein of other monomers with the formation of latices marked by low viscosity and small particle size. Still another object of the invention is to prepare a polymeric dispersion of unusually low viscosity, consisting of a single polymeric component in which dispersing groups are an integral molecular part of said component. Further objects of the invention will appear in the following description thereof.

I have found that new cationically-stabilized polymeric aqueous dispersions, having utility in various technical applications, may be prepared by means of a new polymeric dispersion system in which the dispersing copolymer contains certain especially effective mole ratios of reactants. In general, the polymeric dispersing systems, the two-component dispersions prepared therefrom, and the one-component species are characterized by a low surface tension. Specifically, my preferred dispersing system is prepared from at least two monomers. One of said monomers is a nitrogen-containing ethylenically-unsaturated organic monomer capable of forming a salt with acids: such compounds may be a vinyl pyridine such as 2-, 4-, or 5-vinyl pyridine; a substituted vinyl pyridine, wherein one of the previous vinyl pyridines contains additional, preferably lower alkyl, substituents on the ring or on the alpha position of the vinyl group, such as 2-methyl-5-vinyl pyridine; 2, 3, 4-trimethyl-5-vinyl pyridine; 3, 4, 5, 6-tetramethyl-2-vinyl pyridine and the like: or an unsaturated organic amine of the general formula:

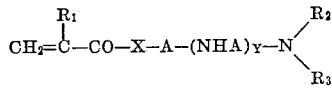

wherein:

$R_1$ is hydrogen or a methyl group,
X is O or NH,
A is an alkylene group selected from the class consisting of dimethylene or isopropylene,
Y is zero or one,
$R_2$ is a hydrogen atom or a saturated alkyl group of not more than four carbon atoms, and $R_3$ is a saturated alkyl group of not more than four carbon atoms, being tertiary butyl when $R_2$ is hydrogen,
and wherein the total number of carbon atoms in both $R_2$ and $R_3$ does not exceed four.

Typical examples of this class of salt-forming amino compounds are dimethylaminoethyl methacrylate, tertiary-butylaminoethyl methacrylate, and amide-amines such as N-(dimethylaminoethyl) acrylamide.

This salt-forming compound is copolymerized with at least one ethylenically-unsaturated acrylic monomer, from the class represented by the general formula

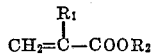

where $R_1$ is a hydrogen atom or a methyl group, and $R_2$ is a saturated alkyl radical. In the case where a polymeric dispersing system is formed for the purpose of carrying on the polymerization of other monomers to form a two-component system, in which the cationic polymer first formed acts as a dispersing agent, $R_2$ is a saturated alkyl radical of not more than four carbon atoms. In the case of a one-component system, in which all of the monomers are copolymerized to form a single polymeric species containing the salt-forming monomer as an integral part of the polymer, $R_2$ is a saturated alkyl radical of not more than eight carbon atoms.

It has been found that in the preparation of stable aqueous dispersions of water-insoluble cationic polymers in satisfactory yield according to the methods set forth herein, any substantial deviation from the limitations set on these alkyl groups will result in failure. The limitations are therefore critical.

Mixtures of more than one such ethylenically-unsaturated monomer may be polymerized with the salt-forming monomer to form ternary dispersing agents, or agents of even higher order, provided that the dispersing system meets the criteria of insolubility set forth more freely hereinbelow.

The ethylenically-unsaturated acrylic comonomer should be in major part, preferably not less than 90 mole percent, chosen from the class set forth immediately above, or mixtures of monomers selected therefrom. In order to impart to the dispersion polymer certain properties of toughness, rigidity, or cross-linking reactivity, a part of the major monomer—preferably not more than 10 mole percent—may be replaced by some other ethylenically-unsaturated monomer including vinyl esters such as vinyl acetate, vinyl laurate, and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, divinyl benzene and the like; acrylic and methacrylic acids, acrylamide and methacrylamide, acrylonitrile, itaconic acid, hydroxyethyl acrylate and methacrylate, and hydroxypropylacrylate and methacrylate.

The preparation of these cationically-stabilized polymeric dispersions, whether it involves the preparation of a cationic polymeric dispersion and the subsequent polymerization of other monomers therein, as in the two-component system, or whether it involves the preparation of a one-component system containing a single species, self-dispersed polymer, is conveniently carried out in an acidified aqueous medium, as is set forth in detail in the examples below. In general, a pH of between 1.0 and 3.5 has been found most effective, with a preferred range of 1.5 to 2.5. Such a pH may be realized by the use of highly dissociated acids such as hydrochloric, nitric, sulfuric, or formic acids, or other strong acids which have a dissociation constant below 5.0 and preferably below 3.0.

The catalyst system which must be employed in the present invention, as pointed out above, is a redox catalyst consisting of an oxidizing agent and a reducing agent, both of which have some water solubility. The oxidizing agent may be, for example, ammonium persulfate, hydrogen peroxide, tertiary butyl peroxy maleic acid, tertiary octyl hydroperoxide, 2,5-dimethylhexyl-2-5-dihydroperoxide, methyl ethyl ketone peroxides, and the like. The reducing agent may be ascorbic acid, dihydroxy maleic acid, reducing sugars and the like, together with a metal ion capable of existing in two valence states such as ferrous, cuprous, vanadyl, stannous, and the like. Such redox catalyst systems promote rapid initiation of polymerization, which minimizes the accumulation of unreacted monomer in the dispersion. Such an accumulation is undesirable, since unreacted monomer is usually a solvent for partially polymerized material, so that the presence of dispersed but unreacted monomer leads to the formation of agglomerated particles and even to coagulum. Coagulum in a latex dispersion is unusable polymer, and not only reduces the yield of effective polymer dispersion but must be removed by filtration or settling before the dispersion can be used as, for example, a binder for nonwoven fabrics. The undesirability of coagulated polymer in a dispersion is especially evident in processes where the polymer is being continually formed and continually removed from the system. Such a continual process is recognized as especially advantageous when the preparation of a polymeric dispersion is coordinated with its utilization. For such reasons, it is essential that the monomers be maintained in proper proportion to each other at all times during the preparation of the polymeric dispersion. If the cationic monomer is present in the polymerizing system for an appreciable time in a mole ratio in excess of the limits set forth herein, a polymer will be formed which is water-soluble or water-sensitive, which will defeat the primary objective of enhanced resistance to the effects of water. If the non-cationic monomer is present in excess, it will dissolve or swell the desired polymeric particles already formed, and coagulum will result.

In general, in preparing a polymeric dispersing system intended for use in the further polymerization of other monomers to form a two-component polymeric latex, the dispersing systems I have found most useful are those in which the mole fraction of the nitrogen-containing monomer in the dispersing system is between 0.1 and 0.5: that is, my preferred polymeric dispersing compositions are those in which the mole ratio of nitrogen-containing monomer to the ethylenically-unsaturated monomer lies between 1 to 9 and 1 to 1. Dispersions outside of this preferred range either are less efficient in the polymerization of subsequently added monomers if the mole fraction of nitrogen-containing monomer is below about 0.1, or tend to become undesirably water soluble if the mole fraction goes much above 0.5.

The following Examples 1, 2, 3 and 4 will illustrate the preparation of typical dispersing systems in accordance with one phase of the processes of this invention.

EXAMPLE 1

A stable cationic emulsifying system was prepared by the slow addition of a mixture of 31.45 grams (0.2 mole) of dimethylaminoethyl methacrylate and 68.54 g. (0.6 mole) of ethyl methacrylate to a stirred and heated (70° C.) solution of 189 ml. of 7.4% hydrochloric acid in 1,679 ml. water. During the addition of the monomer mixture there was also gradually added 12 ml. of 3% aqueous hydrogen peroxide and 20 ml. water in which were dissolved 0.1 g. of ferrous ammonium sulfate and 0.4 g. ascorbic acid. The addition of the various ingredients was spread over a period of about 50 minutes, after which stirring was continued for 15 minutes with the temperature maintained at 70° C.

A smooth and stable emulsifying system resulted, with a surface tension of only 43.1 dynes per centimeter, rendering the system eminently suitable for the rapid and efficient dispersion of other monomeric compounds for polymerization purposes.

EXAMPLE 2

The procedure of Example 1 was repeated except that the monomeric mixture consisted of 1 mole of 2-vinyl pyridine and 3 moles of ethyl methacrylate. A stable dispersing system was formed which had a surface tension of 46.5 dynes per centimeter.

EXAMPLE 3

The procedure of Examples 1 and 2 was repeated except that the monomeric mixture consisted of 1 mole of tertiary butylaminoethyl methacrylate and 3 moles of ethyl methacrylate. The stable dispersing system had a surface tension of 45.9 dynes per centimeter.

EXAMPLE 4

A stable cationic emulsifying system was prepared according to the general procedure of Examples 1, 2, and 3, except that the monomer mixture consisted of 3.73 parts of 4-vinyl pyridine, 10.05 parts of methyl methacrylate, and 1.22 parts of ethylene glycol dimethacrylate. The mole ratios of the ternary composition were 3 moles (70%) of primary acrylic ester, 1 mole (25%) of salt-forming monomer, and 0.2 moles (5%) of modifying ester. The pH of the dispersing system was 1.2, and the surface tension 49.5 dynes per centimeter.

Although considerable latitude may be exercised in the choice of salt-forming monomer and ethylenically-unsaturated co-monomers, nevertheless certain criteria must be fulfilled in order to produce a satisfactory polymeric dispersing system according to this invention. A foremost criterion is that the positively charged copolymer shall be a true dispersion, and not a solution. In general, dispersion is marked by the appearance of a stable, essentially nonstratifying, milkily turbid aqueous phase: unsatisfactory soluble copolymers display little or no haze or turbidity in an aqueous phase. The transition from a satisfactory dispersion state to an unsatisfactory solution state may be brought about by improper selection of the comonomer, as the following experiment illustrates.

The procedure of Example 2 was repeated except that 3 moles of vinyl ethyl ether, instead of ethyl methacrylate, was copolymerized with 1 mole of 2 vinyl pyridine. A clear solution was obtained, of a water-soluble polymer, which displayed little or no dispersing power even though its surface tension was only 37.8 dynes per centimeter. The solution was of no value as a dispersing system.

I have found that the homopolymers of the above-categorized nitrogen-containing salt-forming monomers are not suitable alone as dispersing agents for further polymerization of other monomers according to this invention, due to the fact that such homopolymers in salt form are water soluble. For a true dispersion, it is necessary that the salt-forming monomers be copolymerized with a second monomer or monomeric mixture, and that the second monomer be of such limited water solubility that the copolymer is insoluble in water, but readily dispersed therein in a positively charged salt form. As a quick test of the efficacy of a particular copolymer salt as a dispersing system, it is convenient to shake together about 2 volumes of the system and 1 volume of toluene in a separatory funnel. A suitable copolymer will disperse the toluene into a relatively stable emulsified form in the aqueous phase, whereas an unsatisfactory copolymer, such as a vinyl pyridine-vinyl ethyl ether copolymer, will result in rapid reseparation of the toluene from the aqueous phase.

In addition to the fact that water-soluble copolymers or homopolymers are not efficient dispersing agents, it should be recalled that an object of this invention is to prepare cationic polymeric systems wherein the dispersing agent is relatively insensitive to water. The dispersing copolymer, as prepared in Examples 1, 2, 3 and 4, has essentially polymerized to as great an extent as it is going to polymerize.

That is, when this aqueous copolymer dispersion is used for the polymerization of other monomers, as in the two-component system, there is little or no reaction between the dispersing copolymer and the added monomers, apart from the possibility of a modest amount of graft polymerization. The added monomers polymerize among themselves to form a second and essentially independent copolymeric species. Since the dispersing copolymer is a separate species in the final latex, it should be relatively water-insoluble if the final latex is to be water-insensitive.

In addition to the choice of monomers to be copolymerized to form a satisfactory dispersing system, the mole-ratio of salt-forming monomer to the other monomer must be maintained within certain limits as pointed out above in order to insure water-insolubility. The salts of the nitrogen-containing monomer are in general more water-soluble than the ethylenically-unsaturated monomers with which they are copolymerized: in this respect, they tend to solubilize the copolymer to the extent to which units derived from such salt-forming monomers are found in the copolymer.

Using a mole ratio of 1 salt-forming monomer to between 1 and 9 moles of other monomers, generally satisfactory results are obtained. When the ratio of salt-forming monomer to other monomer exceeds about 1 to 1, however, an unsatisfactory soluble copolymer is liable to result, as seen from the following experiment.

The procedure of Example 1 was repeated except that 4 moles of 2-vinyl pyridine were polymerized with 3 moles of methyl methacrylate. The resulting system had a pH of 1.2 and a surface tension of 41.1 dynes per centimeter, but it was clear and transparent and had no dispersing value due to its water solubility.

It will be apparent to one skilled in the art that the desired insolubility of the dispersing copolymer will also depend upon the solubilising tendency exerted by the nature of the comonomer, as well as on the mole fraction of salt-forming monomer. Thus although 2-vinyl pyridine and ethyl methacrylate in a 1 to 3 mole ratio produced a satisfactory dispersing system (Example 2), replacement of the ethyl methacrylate by the more soluble vinyl ethyl ether, maintaining the same mole ratio, led to a copolymer which was soluble and of little value as a dispersing agent. The true test of an effective dispersing system according to this invention is the formation of a turbid dispersion of an insoluble copolymer in a positively-charged salt form.

The following 14 exemplary dispersing systems, prepared according to the process of this invention, have been found to function satisfactorily in the process of polymerizing other unsaturated monomers. In all cases, the pH of the aqueous phase was between 1.0 and 3.5, the temperature between 70° C. and 95° C., and a redox catalyst as in Example 1 was used. Generally, the concentration of dispersing polymer is about 2% to 10%, preferably around 5%, in the acid aqueous medium.

EXAMPLES 5–18

Three moles of methyl methacrylate with 1 mole of dimethylaminoethyl methacrylate, 2-vinyl pyridine, or 4-vinyl pyridine; 1, 3, or 7 moles of ethyl methacrylate with 1 mole of dimethylaminoethyl methacrylate; 3 moles of ethyl methacrylate with 1 mole of 2-vinyl pyridine or tertiary butyl aminoethyl methacrylate; 1 or 3 moles of butyl methacrylate with 1 mole of dimethylaminoethyl methacrylate; 3 moles of ethyl acrylate with 1 mole of 2-vinyl pyridine; 3 moles of isopropyl methacrylate, isobutyl methacrylate, or tertiary butyl methacrylate with 1 mole of dimethylaminoethyl methacrylate.

The size of the alkyl group attached to the acrylic or methacrylic ester appears to play a significant role in the efficiency of the dispersing system. For example, when 2 moles of hexyl methacrylate were polymerized with one mole of dimethylaminoethyl methacrylate, the monomers failed to form a dispersing system. Neither was a dispersing system formed by trying to react 3 moles of styrene with 1 mole of dimethylaminoethyl methacrylate.

In the case where a cationically-stabilized polymeric dispersing system is formed for the polymerization of other monomers therein, as in a two-component system, the acrylic and methacrylic esters which form the dispersing polymer are limited to not more than four carbon atoms in the alkyl ester group.

As indicated above, a water-soluble copolymer also does not effectively disperse other added unsaturated monomers so as to allow their polymerization. The following dispersing systems were found to be unsatisfactory due to their water-solubility:

Three moles of vinyl ethyl ether with 1 mole of dimethylaminoethyl methacrylate or 2-vinyl pyridine; 3 moles of n-butyl vinyl ether with 1 mole of dimethylaminoethyl methacrylate; 3 or 5 moles of vinyl acetate, or 3 moles of vinyl butyrate, with 1 mole of 2-vinyl pyridine.

A cationically-charged polymeric dispersion system prepared in accordance with this invention may be used in the preparation of addition polymers of ethylenically-unsaturated monomers capable of addition polymerization to form homopolymers or copolymers. Examples of such unsaturated monomers include: esters of ethylenically-unsaturated acids, such as alkyl acrylates, methacrylates, maleates, citraconates and itaconates in which the alkyl ester groups, for example, may contain from 1 to 18 carbon atoms and which may contain such substituents as hydroxy, cyano, or alkoxy groups such as hydroxyethyl methacrylate, cyanoethyl acrylate, methoxyethyl acrylate, and the like; amido, including n-alkyl amido, derivatives of such acids, including amic acids, imides, diamides and ester amides, such as acrylamide, n-butyl acrylamide, maleamic acid, t-butyl maleamic acid, n-butyl itaconimide, dibutyl itaconamide, the ethyl ester of maleamic acid, and the like; vinyl esters such as vinyl acetate, vinyl propionate, and vinyl laurate; vinyl esters such as methyl vinyl ether, ethyl vinyl ether, and isobutyl vinyl ether; vinyl chloride and vinylidine chloride; styrenes and substituted styrenes such as beta methyl styrene and the like; and dienes such as butadiene and substituted derivatives thereof, isoprene, chloroprene, and the like; vinyl pyrrolidone and the like. The choice of monomers will depend on the balance of properties which it is desired to achieve in the particular end-use to which the polymeric latex is to be put. In a preferred embodiment, this monomer is an alkyl ester of acrylic or methacrylic acid or mixture thereof in which the alkyl group contains from 1 to 8 carbon atoms.

EXAMPLE 19

Preparation of two-component polymer dispersions

A monomeric mixture of 65.85 parts by weight of ethyl acrylate, 30.30 parts 2-ethyl hexyl acrylate, and 3.85 parts of hydroxyethyl methacrylate, containing 0.115 part of dodecyl mercaptan, was added slowly to 191 parts of a cationic-active dispersing system composed of a dispersion of a 1 mole to 3 mole copolymer of dimethylaminoethyl methacrylate and ethyl methacrylate, prepared as in Example 1. The concentration of the copolymer in the dispersing system was 5% by weight.

During the polymerization there was also added at intervals a total of 7 parts of hydrogen peroxide of 3% concentration, together with 0.1 part of ferrous ammonium sulfate and 0.4 part of ascorbic acid in 10 parts of water, at a rate which kept the reaction temperatures at between 25° C. and 43° C. The resulting cationic polymeric dispersion had a pH of about 1.5, a solids content of about 36%, and a Brookfield viscosity at 50 r.p.m. of 68 centipoises. The milky white dispersion was free from coagulum and large particles, and was readily coagulated to a gel by the addition of ammonia.

Films cast from such a dispersion and coagulated while still wet by exposure to ammonia vapor are after drying tough and coherent, and do not lose their strength when wet. The tensile strength and modulus of binders prepared according to this invention may be increased by the inclusion of conventional cross-linking monomers in the polymeric dispersion, or by the addition of cross-linking agents such as melamine formaldehyde.

EXAMPLE 20

To 50 parts by weight of the dispersing system of Example 1 there was added gradually 25 parts of vinyl acetate, while the dispersion system was maintained at 70° C. During the addition of the vinyl acetate there was added simultaneously 14 parts of an aqueous solution containing 0.07 part of ferrous ammonium sulfate and 0.28 part of ascorbic acid, as well as 3 parts of 3% hydrogen peroxide. Stirring at 70°–80° C. was continued for 30 minutes after the vinyl acetate addition was completed.

The resulting cationic polyemric dispersion had a pH of about 1.8 and a Brookfield viscosity at 20 r.p.m. of 10 centipoises. It was free from coaglum and large particles, and was readily coagulated to a gel by the addition of ammonia.

EXAMPLE 21

A cationic dispersing system was prepared as follows. The aqueous system consisted of 847 parts of $H_2O$, 87 parts of 7% HCl, and 2 parts of 3% hydrogen peroxide. To this there was added, gradually and with stirring over the course of 30 minutes, a mixture of 36.6 parts (0.258 mole) of butyl methacrylate and 13.4 parts (0.085 mole) of dimethylaminoethyl methacrylate. The ratio of butyl methacrylate to salt-forming monomer was 3 to 1. Simultaneously with the monomers there was added 5 parts of a solution of 0.025 part of ferrous sulfate and 0.05 part of ascorbic acid in water. One third of the way through the addition of the monomers, another 2 parts of 3% hydrogen peroxide was added, and a like amount two-thirds of the way through the addition. The temperature was maintained at 70° C. for 1 hour, with stirring, to complete the formation of the polymeric dispersion system.

To 200 parts of the above polymeric dispersion system heated at 75° C. there was added with stirring a mixture of 63 parts of ethyl acrylate and 31 parts of methyl methacrylate, simultaneously with the addition of 7 parts of 3% hydrogen peroxide, and a solution of 0.1 part ferrous ammonium sulfate and 0.4 part ascorbic acid in 10 parts of water. Addition was complete in a period of 15 minutes. The resulting dispersion was heated to 83° C. for 30 minutes, with stirring. The resulting dispersion contained no coagulum. It had a pH of about 1.3, a surface tension of 39.7 dynes per centimeter, and a Brookfield viscosity of 16 centipoises at 20 r.p.m. The solids content was 34.0% versus a theoretical content of 34.4%.

Essentially identical results were obtained when the ratio of n-butyl methacrylate to dimethylaminoethyl methacrylate in the dispersion system was increased to 6.9 to 1, and then to 9 to 1: that is, in each case the dispersing system served to promote the subsequent polymerization of an ethylenically-unsaturated monomeric mixture without the formation of any precipitate or coagulum.

It has been my general experience that when a dispersing system is formed from an acrylic ester and a salt-forming monomer in a mole ratio exceeding 9 to 1, polymerization of other ethylenically-unsaturated monomers in such a system does not proceed smoothly, a certain percentage of the yield is lost in unusable coagulum, and the resulting polymeric dispersion always requires laborious filtration before being usable as a coating or binder latex. My preferred range, therefore, is the use of not more than 9 moles of acrylic ester to 1 mole of salt-forming comonomer.

In addition to the variables set forth above, the ordinary variables and auxiliary procedures commonly used in the art of preparing and using polymeric dispersing systems also apply to the process of this invention. Increased temperature promotes more rapid reaction, smaller particle size, and consequently lower surface tension, as does efficient agitation. The use of finely-divided inert material, such as fuller's earth, is frequently useful in obtaining better polymeric dispersions presumably by surface adsorption of the reactants with a consequent large surface area exposure. The second polymer of the two-component species is generally prepared at a concentration of from 20% to 45%, a convenient and conventional working range for commercial polymeric latices. Ordinarily, about one part of polymeric dispersing agent is used with from about 10 to 20 parts of main polymer, so that the amount of cationic salt-forming monomer present is no more than about 10 mole percent of the total monomers present in both species of polymer.

Utilization of cationically-stabilized polymeric dispersions in the preparation of pressure-sensitive adhesives The polymeric dispersions described herein are useful in the preparation of pressure-sensitive adhesive addition polymers. The adhesive polymer produced is dispersed in the aqueous medium. Adhesive tapes may be prepared therefrom by coating a suitable backing with the dispersion and evaporation of the essentially aqueous medium in which the polymer is dispersed. The cationically-charged polymer of the dispersing system preferably is a labile complex that is destroyed upon removal of the aqueous medium. The dried adhesive polymer as deposited directly from the dispersion is free of water-sensitive components such as may be present in the case of adhesive polymers prepared by conventional emulsion polymerization systems. Accordingly, laborious and expensive procedural steps for the removal of water-sensitive emulsifying or dispersing agent are obviated by this invention.

Pressure-sensitive adhesive polymers are rubbery, elastomeric polymers which by themselves exhibit the balance of tack, adhesion and cohesion characteristic of pressure-sensitive adhesives. Pressure-sensitive adhesive polymers may be synthesized by the addition polymerization of certain ethylenically unsaturated monomers. Examples of these are homoacrylate polymers derived from alkyl acrylates averaging from about 4–12 carbon atoms in the alkyl ester groups; copolymers of said acrylates and a minor amount of copolymerizable acrylic monomer such as acrylic acid; and copolymers of $C_1$ to $C_{14}$ alkyl acrylates or methacrylates and from minor to substantial amounts of a copolymerizable N-alkyl amido derivative of an ethylenically-unsaturated monocarboxylic and/or alpha-beta dicarboxylic acid. In the case of the latter copolymers, the number of carbon atoms in the alkyl ester groups of the acrylates or methacrylates, the number of carbon atoms in the N-alkyl or alkyl ester group of the copolymerizable monomer, the structure of these N-alkyl and alkyl ester groups and proportion of the respective monomers are interdependent in the production of these pressure-sensitive adhesive polymers. The preparation of a pressure-sensitive adhesive acrylate/N-alkyl amic acid polymer utilizing the dispersing system of this invention is illustrated in the following example.

EXAMPLE 22

A cationically-charged dispersion system was prepared according to the general procedure of Example 1, using a 6.9 to 1 mole ratio of ethyl acrylate to dimethylaminoethyl methacrylate.

To 100 parts of this aqueous dispersing medium there were added, in a 1 to 1 to 4 mole ratio, 50 parts of a mixture of N-alkyl maleamic acids, ethyl arcylate, and butyl acrylate.

The N-alkyl maleamic acids were prepared by a amidating maleic anhydride with a mixture of alkyl amines marketed by Rohm and Haas as Primene 81–R. This commercially available product is reported to be a mixture of N-t-alkyl primary amines containing the structural element

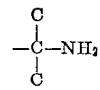

and consisting principally of $C_{11}$ to $C_{14}$ alkyl amines. As reported in the Rohm and Haas Brochure SP–33, this mixture has a neutral equivalent of 191, corresponding to an alkyl amine having an average of about 12 carbon atoms.

The N-alkyl maleamic acid, ethyl acrylate, and butyl acrylate monomers were copolymerized in the ethyl acrylate-dimethylaminoethyl methacrylate dispersion system at 70° C. using a hydrogen peroxide-ferrous ammonium sulfate-ascorbic acid redox catalyst. The final aqueous polymeric dispersion had a pH of 1.8 and a Brookfield viscosity at 50 r.p.m. of about 12 centipoises.

This low viscosity rendered the polymeric dispersion unsuitable for spreading on a backing to form an adhesive tape. However, the addition of a small amount of methyl ethyl ketone directly to the aqueous polymeric dispersion rapidly thickened the dispersion to a viscosity of several thousand centipoises. In this phase it was readily spread on a polyester film and allowed to dry. Drying was accompanied by the spontaneous evolution of HCl. The resulting film-backed adhesive mass had excellent tack, and the combination was useful as an adhesive tape.

Utilization of cationically-stabilized polymeric dispersions in the preparation of bonded non-woven fabrics Cationically-stabilized polymeric dispersions prepared in accordance with this invention have been found to be advantageous in the bonding of webs of fibers to form non-woven fabrics. Since the dispersion is cationic, the fibrous web, saturated with the dispersion, may be treated with an alkaline agent, such as ammonia, to coagulate the binder in situ, thus minimizing the migration of binder to the web surfaces which accompanies the drying of non-woven fabrics saturated with conventional latices. Additionally, since the dispersions of this invention are stabilized by a cationically-charged polymer, the system does not contain soap, surfactants, or other low molecular weight water-soluble agents commonly used in the preparation of conventional latices. Thus the bond between fiber and polymer is less sensitive to deterioration when the non-woven fabric is wet with water, and a high ratio of wet-strength to dry strength is attained as illustrated in the following example.

EXAMPLE 23

A cationically-stabilized copolymer of ethyl acrylate, 2-ethylhexyl acrylate, and hydroxyethyl methacrylate was prepared in a cationically-charged polymeric dispersion of ethyl methacrylate and dimethylaminoethyl methacrylate, as set forth in Example 19 above.

This dispersion was applied directly to a lightly-needled web of rayon fibers prepared on a Rando-Webber. The add-on was 25% added solids on the weight of the web. While still wet, the web was exposed to ammonia vapor to coagulate the dispersion to a firm, relatively non-migratory gel, and dried. The dry weight of the bonded web was 70 grams per square yard.

Tensile strengths were measured on inch-wide strips using the Instron Tester. The dry machine-direction strength was 4.37 pounds, wet machine-direction strength 3.47 pounds, a ratio of 79% wet to dry. The dry crosswise strength was 4.23 pounds and the wet crosswise strength was 3.13 pounds, a wet-to-dry ratio of 74%. These ratios of wet-to-dry strength are unusually high for bonded non-woven fabrics. The bonded non-woven fabric appeared uniformly impregnated with binder throughout its thickness, and could not be delaminated.

Dispersion polymers comprising the lower esters, ethyl and methyl, of acrylic and methacrylic acids are particularly advantageous in the preparation of non-woven fabric binders when employed in a ratio of 2 to 5 moles of ester to one mole of salt-forming monomer. The second polymeric species, constituting the principal binder, may be a mixture of acrylic or methacrylic esters containing from 1 to 8 carbon atoms in the ester group, to provide the desired combination of toughness and strength without brittleness. Polyvinyl acetate is another eminently suitable binding agent. To increase the modulus of the binder, acrylonitrile may be mixed with an acrylic ester, and hydoxyethyl methacrylate may be added for cross-linking purposes. Other desirable polymeric dispersions prepared in accordance with this invention will readily suggest themselves to those skilled in the non-woven art.

One-component system

The cationic monomers employed in preparing copolymer dispersions for use as dispersing systems may also be employed in preparing one-component self-dispersed polymers. In such case, the cationic monomer must be employed in amounts from 2 to 10 mole percent of the total monomers present, the remainder being an acrylic monomer of the general formula:

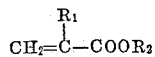

where $R_1$ is hydrogen or a methyl group and $R_2$ is a saturated alkyl radical having 1 to 8 carbon atoms. As in the case of the dispersing polymer of the two-component system, up to 10 mole percent of the acrylic monomer may be replaced by another ethylenically unsaturated monomer.

In the preparation of my single-component cationic polymeric systems, the same conditions of acidic aqueous medium, catalysts, etc., pertain as in the case of my two-component systems.

It has been my experience that when the polymerization is conducted with a non-redox catalyst and with all of the monomers either initially present or added sequentially without regard to mole ratios, difficulties are encountered in initiation of polymerization and in formation of coagulum, or of water-sensitive polymers, or both. As set forth above, the result of temporarily exceeding the range of mole ratios or percentages set forth herein is the formation of undesired polymeric species.

The improved process of this aspect of the invention, the one-component system, therefore, comprises maintaining the ratio of cationic salt-forming monomer to the remaining monomer or monomers within the specified range throughout the polymerization and ensuring that polymerization, initiated by a redox catalyst system, is continued throughout the period during which the monomeric materials are being added to the reaction (i.e. polymerization) mixture.

The following examples will illustrate various methods for practicing the process of this phase of my invention.

EXAMPLE 24

An aqueous acidic medium was prepared by placing 1040 parts by weight of water and 137 parts of 7.4% aqueous HCl in a reaction vessel, which was then purged with nitrogen and heated to 75° C., after which 8 parts of 3% aqueous $H_2O_2$ were added with vigorous stirring. With continued stirring and in a nitrogen atmosphere there were gradually added separately but simultaneosuly 10 parts of a solution of 0.05 part of ferrous ammonium sulfate and 0.2 part of ascorbic acid in 10 parts of water, together with 647 parts of a mixture of the following monomers:

| | Parts |
|---|---|
| Ethyl acrylate | 160 |
| N-butylacrylate | 410 |
| Acrylonitrile | 46 |
| Hydroxyethyl methacrylate | 11 |
| Dimethylaminoethyl methacrylate | 19 |
| Dodecyl mercaptan, as terminating agent to control molecular weight | 1 |

After about 160 parts, or one-quarter of the monomer mixture had been added, an additional 8 parts of 3% $H_2O_2$ were added, said addition being repeated after one-half, three-quarters, and all of the monomer had been added. Agitation and heating were then continued to complete the reaction.

The result was a stable and homogeneous dispersion of a cationically-charged polymer, in which about 3% by weight (1.8 mole percent) of the polymer was derived from the nitrogen-containing, salt-forming monomer. The polymeric dispersion was self-dispersed, free from surfactants, and was readily coagulated by amomnia. It had a pH of 1.7, a solids content of 33%, and a Brookfield viscosity at 50 r.p.m. (spindle #2) of only 11 centipoises, making it suitable for ready penetration into and saturation of nonwoven webs, even without further dilution as is frequently necessary with relatively viscous conventional polymeric dispersions.

EXAMPLE 25

Using the same general procedure as in Example 1, with the same catalyst in the same proportions, the following mixture of monomers was added to a solution of 21 parts of concentrated sulfuric acid (95-98%) in 1,000 parts of water at 80° C.:

| | Parts |
|---|---|
| Ethyl acrylate | 250 |
| N-butyl acrylate | 630 |
| Hydroxyethyl methacrylate | 20 |
| Acrylonitrile | 70 |
| 2-vinyl pyridine | 30 |

The resulting stable polymeric dispersion was cationic, in which 2.8 mole percent of the polymer was derived from the nitrogen-containing salt-forming substituted pyridine monomer. It was readily coagulated by ammonia, had a solids content of 35%, a pH of 1.7, and a Brookfield viscosity at 50 r.p.m. (spindle #2) of 18 centipoises.

EXAMPLE 26

A mixture of 1 mole ethyl acrylate, 2 moles butyl acrylate, and 0.068 mole dimethylaminoethyl methacrylate was prepared, the mixture containing about 2.2 mole percent of the cationic salt-forming monomer.

Fifty parts by weight of the mixture was added continuously and slowly, over a period of 30 minutes, to a polymerization medium comprising a solution in 189 parts water of 2.2 parts 85% phosphoric acid and 0.63 part of tertiary butyl hydroperoxide, the pH of the solution being about 3.0 and the temperature being maintained at 70° C. A separate reducing solution of 0.05 part of ferrous ammonium sulfate and 0.2 part ascorbic acid in 10 parts of water was also added continuously to the polymerization medium over the same period of time as the monomer mixture. Polymerization began promptly after addition of monomers was begun, a blue colored dispersion being formed initially and becomig whitish in color as additional polymer was formed. The polymerization medium was stirred at 70° C. for about one hour after all of the monomer and reductant solution had been added. The finished stable dispersion contained approximately 20% by weight of water-insoluble polymer self-dispersed in the aqueous medium.

EXAMPLE 27

The procedure of Example 26 was repeated except that the tertiary butyl hydroperoxide was initially mixed with the monomer mixture instead of with the water, and there was substituted for the ascorbic acid 0.1 part of dihydroxymaleic acid. The results were the same as in Example 26.

EXAMPLE 28

The procedure of Example 26 was repeated except that the tertiary butyl hydroperoxide was omitted and there was used instead 0.1 part of t-butyl peroxy maleic acid mixed with the monomer mixture. The results were the same as in Example 26.

EXAMPLE 29

The procedure of Example 26 was repeated except that the tertiary butyl hydroperoxide was omitted and replaced by 0.15 part of cumene hydroperoxide in the monomer mixture. The results were the same as in Example 26.

EXAMPLE 30

The procedure of Example 26 was repeated except that the tertiary butyl hydroperoxide was replaced by 0.06 part of hydrogen peroxide in the polymerization medium, and an additional 0.06 part of hydrogen peroxide was added after one-half of the monomers had been added, and except that the reducing solution was replaced by a solution of 0.05 part cuprous chloride and 0.2 part ascorbic acid in 15 parts of water. The results were the same as in Example 26.

EXAMPLE 31

The procedure of Example 26 was repeated except that the tertiary butyl hydroperoxide was omitted and replaced by a solution of 0.5 part ammonium persulfate in 10 parts of water, which was added continuously to the polymerization mixture while the monomers were being added, and except that the reducing solution was added intermittently in small portions instead of being added continuously. The results were the same as in Example 26.

EXAMPLE 32

The procedure of Example 26 was repeated except that instead of dissolving 0.63 part of tertiary butyl peroxide in the polymerization medium, only 0.3 part of this peroxide was dissolved in 10 parts of water, which was added continuously over the same period of time as the monomers. In addition, instead of adding the reducing solution continuously, there was mixed with the monomer mixture 0.05 part of vanadyl acetyl acetonate, and a solution of 0.3 part ascorbic acid in 10 parts of water was added intermittently in small portions. The results were the same as in Example 26.

EXAMPLE 33

The procedure of Example 26 was repeated except that the tertiary butyl hydroperoxide was omitted and replaced by a mixture of 0.06 part hydrogen peroxide and 0.15 part tertiary butyl hydroperoxide. In addition, a solution of 0.15 part tertiary butyl hydroperoxide in 10 parts of water was added after one half of the monomer mixture had been added, and the reducing solution was replaced by a solution of 0.5 cuprous chloride and 0.2 part ascorbic acid in 10 parts of water, which solution was added intermittently in small portions during polymerization. The temperature was held at 28 to 32° C. The results were the same as in Example 26.

The various redox catalyst systems illustrated in Examples 26–33 are also effective in preparing dispersions of polymers of the type described in Examples 1–4 useful in a two-component system, in which the mole ratio of the acrylic ester type monomer to cationic salt-forming monomer is from 1:1 to 9:1.

As set forth above, the preparation of a self-dispersed cationic polymeric dispersion by the gradual addition of the reactive monomers to an aqueous acidic system in which polymerization is rapidly initiated and steadily promoted by a redox catalyst results in a high degree of reaction completion and a minimum amount of loss due to coagulum, since the monomers do not accumulate to excess in the presence of partial polymers. The reaction is relatively slow at temperatures below about 5° C. and at about 100° C. the aqueous medium may tend to boil. Although polymerization may be conducted at these extremes of temperature, my preferred reaction temperature is 60° to 90° C. which, with the gradual stepwise addition of monomer to the reacting system, promotes a smooth and complete reaction. The method set forth above may be modified by the common methods customarily employed in the art of preparing polymeric dispersions. As is expected, increased temperature promotes more rapid reaction, smaller particle size, and consequently lower surface tension, as does efficient agitation. The addition of finely-divided inert adsorbent material, such as fuller's earth, is frequently useful in obtaining better polymeric dispersions, presumably by surface adsorption of the reactants with consequent large surface area exposure.

The self-dispersed polymer is generally prepared at a concentration of from 20% to 45%, a convenient and conventional working range for commercial polymeric latices. Ordinarily, about 2% to 10% of the polymer is made up of groups derived from the nitrogen-containing, salt-forming monomer, with a preferred range of 3% to 5%, although this figure may be varied.

Having thus described my invention, I claim:

1. The process of preparing a self-stabilized polymeric dispersion free from surfactant in which the dispersed polymer is water-insoluble and contains cationic groups which comprises:

introducing into an aqueous medium at pH between about 1.0 and about 3.5
(I) at least one monomer selected from the class consisting of (1) alkyl acrylic esters and alkyl methacrylic esters in which the alkyl group contains up to eight carbon atoms and (2) mixtures thereof with up to 10 mole percent of other ethylenically unsaturated monomer and
(II) at least one nitrogen-containing salt-forming monomer selected from the class consisting of vinyl pyridines, substituted vinyl pyridines, and compounds having the structure

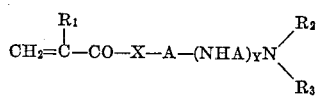

wherein $R_1$ is hydrogen or a methyl group; X is oxygen or NH; A is an alkylene group selected from the class consisting of dimethylene and isopropylene; Y is zero or one; $R_2$ is a hydrogen atom or a saturated alkyl group of not more than 4 carbon atoms; $R_3$ is a saturated alkyl group of not more than 4 carbon atoms, the total number of carbon atoms in $R_2$ and $R_3$ combined not exceeding 4, $R_3$ being a tertiary butyl group when $R_2$ is a hydrogen atom,
initiating polymerization in said medium by means of a redox catalyst system, and continuing polymerization throughout the period during which said monomers are being introduced into said medium, and maintaining the amount of said one monomer present in said medium within the range 90 to 98 mole percent and the amount of said salt-forming monomer present in said medium within the range 2 to 10 mole percent throughout the period during which said monomers are being introduced into said medium, to form a water-insoluble cationically-charged polymer consisting of said monomer polymerized within said ranges of proportions, said dispersion forming a water-insensitive deposit when dried.

2. The process as claimed in claim 1 in which the salt-forming monomer is vinyl pyridine.

3. The process as claimed in claim 1 in which the salt-forming monomer is dimethylaminoethyl methacrylate.

4. The process of preparing a polymer dispersion free from surfactants in which the dispersed polymer is water-insoluble and contains cationic groups, which comprises:
 introducing into an aqueous medium at a pH between about 1.0 and about 3.5
 (I) at least one monomer selected from the class consisting of (1) alkyl acrylic esters and alkyl methacrylic esters in which the alkyl group contains up to four carbon atoms and (2) mixtures thereof with up to 10 mole percent of other ethylenically unsaturated monomer and
 (II) at least one nitrogen-containing salt-forming monomer selected from the class consisting of vinyl pyridines, substituted vinyl pyridines, and compounds having the structure

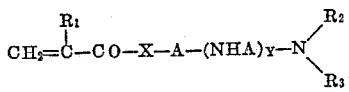

wherein $R_1$ is hydrogen or a methyl group; X is oxygen or NH; A is an alkylene group selected from the class consisting of dimethylene and isopropylene; Y is zero or one; $R_2$ is a hydrogen atom or a saturated alkyl group of not more than 4 carbon atoms; $R_3$ is a saturated alkyl group of not more than 4 carbon atoms, the total number of carbon atoms in $R_2$ and $R_3$ combined not exceeding 4, $R_3$ being a tertiary butyl group when $R_2$ is a hydrogen atom,
initiating polymerization in said medium by means of a redox catalyst system, and continuing polymerization throughout the period during which said monomers are being introduced into said medium, and maintaining the molar ratio of said one monomer to said salt-forming monomer within the range from 1:1 to 9:1 in said medium throughout the period during which said monomers are being introduced into said medium to form a water-insoluble cationically-charged polymer consisting of said monomers polymerized within said range of ratios, said dispersion forming a water-insensitive deposit when dried.

5. The process of preparing a polymer dispersion of at least two different water-insoluble polymers, at least one of which contains cationic groups, said dispersion being free from surfactant, which comprises preparing a first polymer dispersion as claimed in claim 4, introducing into said first polymer disperison at least one water-insoluble ethylenically unsaturated monomer, and polymerizing the last said monomer in said medium in the presence of said first polymer as the sole dispersing agent to form a water-insoluble polymer of the last said monomer.

6. The process as claimed in claim 5 in which the last said monomer is selected from the class consisting of alkyl esters of acylic and methacrylic acid in which the alkyl group contains from 1 to 8 carbon atoms.

7. A single species polymeric composition comprising an aqueous dispersion of a cationically-charged water-insoluble copolymer of at least two monomers, one of said monomers being a salt-forming nitrogen-containing monomer selected from the class consisting of vinyl pyridines, substituted vinyl pyridines, and compounds of the class represented by

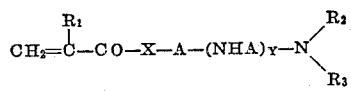

wherein $R_1$ is hydrogen or a methyl group; X is O or NH; A is an alkylene group selected from the class consisting of dimethylene and isopropylene; Y is zero or one; $R_2$ is a hydrogen atom or a saturated alkyl group of not more than 4 carbon atoms; $R_3$ is a saturated alkyl group of not more than 4 carbon atoms, the total number of carbon atoms in $R_2$ and $R_3$ combined not exceeding 4; R being a tertiary butyl group when $R_2$ is a hydrogen atom: together with at least one monomer selected from the class consisting of alkyl esters of acrylic and methacrylic acids wherein the esterifying alkyl group contains not more than eight carbon atoms and mixtures of said esters with up to 10 mole percent of other ethylenically unsaturated monomer, the polymeric composition containing between 2 and 10 mole percent of the nitrogen-containing monomer, said dispersion forming a water-insensitive deposit when dried.

8. A polymeric composition suitable for dispersing ethylenically-unsaturated monomers comprising an aqueous dispersion of a cationically-charged water-insoluble copolymer of at least two monomers, one of said monomers being a salt-forming nitrogen-containing monomer selected from the class consisting of vinyl pyridines, substituted vinyl pyridines, and compounds of the class represented by

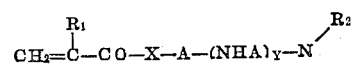

wherein $R_1$ is hydrogen or a methyl group; X is O or NH; A is an alkylene group selected from the class consisting of dimethylene and isopropylene; Y is zero or one; $R_2$ is a hydrogen atom or a saturated alkyl group of not more than 4 carbon atoms; $R_3$ is a saturated alkyl group of not more than 4 carbon atoms, the total number of carbon atoms in $R_2$ and $R_3$ combined not exceeding 4; R being a tertiary butyl group when $R_2$ is a hydrogen atom; together with at least one monomer selected from the class consisting of esters of acrylic and methacrylic acids wherein the esterifying alkyl group contains not more than four carbon atoms,
 said copolymer comprising from one unit to nine units derived from said acrylic ester for each unit derived from said salt-forming monomer, said dispersion forming a water-insensitive deposit when dried.

9. A cationically-stabilized polymer latex comprising at least two different polymeric species, the first of said species comprising a cationically-charged water-insoluble copolymer of at least one salt-forming nitrogen-containing monomer selected from the class consisting of vinyl pyridines, and compounds of the class

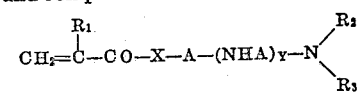

wherein $R_1$ is hydrogen or a methyl group; X is O or NH; A is an alkyl group selected from the class consisting of dimethylene and isopropylene; Y is zero or one; $R_3$ is a hydrogen atom or a saturated alkyl group of not more than 4 carbon atoms; the total number of carbon atoms in $R_2$ and $R_3$ combined not exceeding four,
 $R_3$ being a tertiary butyl group where $R_2$ is a hydrogen atom;
 together with at least one monomer chosen from the class consisting of alkyl esters of acrylic and methacrylic acids wherein the esterifying alkyl group contains not more than four carbon atoms;
wherein said copolymer comprises from one unit to nine units derived from said acrylic ester for each unit derived from said salt-forming monomer, the second of said polymeric species being a water-insoluble polymer of at least one ethylenically-unsaturated compound, said second polymeric species being maintained in stable dispersed form by said positively-charged first species, said latex forming a water-insensitive deposit when dried.

10. The product according to claim 9 wherein said second polymeric species is a polymer selected from the class consisting of polymerized acrylic and methacrylic alkyl esters containing from 1 to 8 carbon atoms in the ester group.

11. The process as claimed in claim 1 in which said nitrogen containing salt-forming monomer is a vinyl pyridine.

12. The process as claimed in claim 1 in which the nitrogen-containing salt-forming monomer is a substituted vinyl pyridine.

13. A single species polymeric composition as claimed in claim 7 in which the salt-forming nitrogen-containing monomer is a vinyl pyridine.

14. A single species polymeric composition as claimed in claim 7 in which the salt-forming nitrogen-containing monomer is a substituted vinyl pyridine.

15. A stable, self-dispersed aqueous polymeric dispersion, free from surfactants, and in which the polymer is cationically charged, which comprises a water-insoluble copolymer comprising:
2 to 10 mole percent of a salt-forming monomer selected from the class consisting of vinyl pyridines and substituted vinyl pyridines,
80 to 98 mole percent of at least one monomer of the general formula $$CH_2=C-COOR_1$$
$$|$$
$$R$$

wherein R is hydrogen or a methyl group and $R_1$ is an alkyl group containing between 1 and 8 carbon atoms, and
zero to 10 mole percent of other ethylenically-unsaturated monomers,
said polymeric dsipersion being in an aqueous medium of a pH of between 1.5 and 3.5, said dispersion forming a water-insensitive deposit when dried.

References Cited
UNITED STATES PATENTS
2,880,116   3/1959   Alps et al.
3,108,979   10/1963   LeFevre et al.

OTHER REFERENCES
Ind. Eng. Chem. 47:863–6 (1955) Pritchard et al. (TPI A58).

MURRAY TILLMAN, *Primary Examiner.*

J. L. WHITE, *Assistant Examiner.*